US008756259B1

(12) United States Patent
Crain

(10) Patent No.: US 8,756,259 B1
(45) Date of Patent: *Jun. 17, 2014

(54) STRUCTURED DATA CONVERSION SYSTEM

(75) Inventor: Louis M. Crain, La Mesa, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 798 days.

This patent is subject to a terminal disclaimer.

(21) Appl. No.: 12/932,342

(22) Filed: Feb. 10, 2011

Related U.S. Application Data

(62) Division of application No. 12/930,910, filed on Dec. 30, 2010.

(51) Int. Cl.
G06F 17/30 (2006.01)

(52) U.S. Cl.
USPC ............ 707/813; 707/736; 707/758; 707/999

(58) Field of Classification Search
USPC .................................. 707/813, 736, 758, 999
See application file for complete search history.

(56) References Cited

U.S. PATENT DOCUMENTS

| 7,043,716 | B2 * | 5/2006 | Zimmer et al. ............... 717/107 |
| 7,321,901 | B1 * | 1/2008 | Blinn et al. .................... 707/784 |
| 7,562,352 | B2 * | 7/2009 | Yamada et al. ............... 717/136 |
| 7,603,368 | B2 * | 10/2009 | Super et al. ........................... 1/1 |
| 7,933,755 | B1 * | 4/2011 | Warlock ............................ 703/6 |
| 8,326,850 | B2 * | 12/2012 | Mineno et al. ................ 707/756 |
| 2002/0049777 | A1 * | 4/2002 | Terayama et al. ............. 707/200 |
| 2003/0055836 | A1 * | 3/2003 | Dubovsky ...................... 707/102 |
| 2005/0144166 | A1 * | 6/2005 | Chapus et al. ..................... 707/6 |
| 2005/0216917 | A1 * | 9/2005 | Krishnaswamy et al. ..... 719/315 |
| 2006/0107997 | A1 * | 5/2006 | Matsui et al. .................. 136/263 |
| 2007/0297684 | A1 * | 12/2007 | Ishizuka et al. ............... 382/232 |
| 2009/0204921 | A1 * | 8/2009 | Vestyck ......................... 715/769 |
| 2010/0169353 | A1 * | 7/2010 | Soetarman .................... 707/759 |
| 2011/0078211 | A1 * | 3/2011 | Gass et al. ..................... 707/803 |

OTHER PUBLICATIONS

Qiming Zhou et al. Digital Image Processing and Interpretation Hong Kong, 1999.*

* cited by examiner

*Primary Examiner* — Hosain Alam
*Assistant Examiner* — Ahmed Abraham
(74) *Attorney, Agent, or Firm* — James M. Saunders

(57) ABSTRACT

Embodiments of the invention relate to converting infrared, radar, and photographic sensor data using an apparatus having a graphical user interface, a user-selection device, and an electronic processor configured to convert sensor data and output the converted sensor data. An infrared, radar, and photographic sensor data conversion computer program (abbreviated "computer program") is associated with the electronic processor. A sensor standard definition file is consistent with a sensor standard (abbreviated "the standard") and is configured for input to the computer program. The sensor standard definition file is a programmable external file defining specifics (elements used to communicate sensor data in the computer program) of the standard. The sensor standard definition file is editable and extendable to support changes in the standard. A sensor standard rules file, sensor external standard file, and sensor external data file are consistent with the standard and are operatively associated with the computer program.

13 Claims, 9 Drawing Sheets

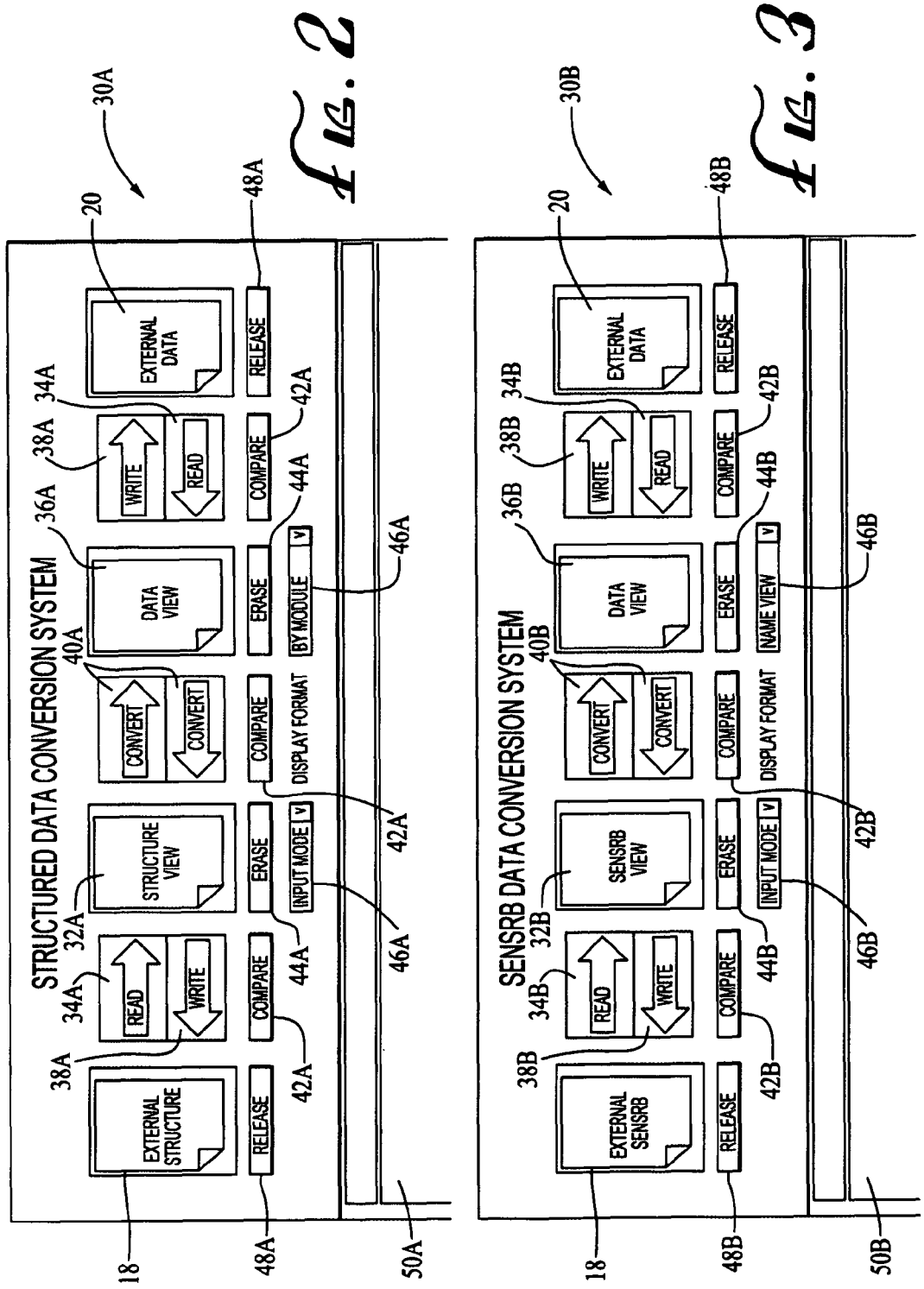

INPUTFORM 1.01    MODULE 01:   GENERAL DATA

| INDEX | FIELD NAME | DEFINITION | UNITS | VALUE RANGE | VALUE |
|---|---|---|---|---|---|
| 01 | GENERAL DATA | GENERAL DATA FLAG. FLAG FIELD INDICATING THE PRE | - | Y | Y |
| 01a | SENSOR | SENSOR COMMON NAME. IDENTIFIES THE SENSOR THAT | - | SHARP | SHARP |
| 01b | SENSOR URI | THIS OPTIONAL FIELD ALLOWS A SENSOR DEVELOPER T | - | | |
| 01c | PLATFORM | PLATFORM COMMON NAME. IDENTIFIES THE PLATFORM | - | F - 18 | F - 18 |
| 01d | PLATFORM URI | THIS OPTIONAL FIELD ALLOWS A SENSOR DEVELOPER TO | - | | |
| 01e | OPERATION DOMAIN | OPERATION DOMAIN. IDENTIFIES THE SPATIAL DOMAIN | - | AIRBORNE | AIRBORNE |
| 01f | CONTENT LEVEL | CAPABILITY SUPPORT. IDENTIFIES THE CAPABILITY SENS | - | 6: ENHANCED GEO | 6: ENHANCED GEOPOSITIONING |
| 01g | GEODETIC SYSTEM | GEODETIC REFERENCE SYSTEM. IDENTIFIES THE GEODED | - | WGS84 | WGS84 |
| 01h | GEODETIC TYPE | GEODETIC COORDINATE TYPE. IDENTIFIES THE COORDIN | - | G: GEODETIC | G: GEODETIC |
| 01i | ELEVATION DATUM | ELEVATION AND ALTITUDE DATUM. IDENTIFIES THE REF | - | HAE: HT ABOVE EL | HAE: HT ABOVE ELLIPSOID |
| 01j | LENGTH UNIT | LENGTH UNIT SYSTEM. IDENTIFIES THE UNIT SYSTEM US | - | EE: ENGLISH | EE: ENGLISH |
| 01k | ANGULAR UNIT | ANGLE UNIT TYPE. IDENTIFIES THE UNIT TYPE USED FOR | - | DEG: DEGREES | DEG: DEGREES |
| 01l | START DATE | IMAGING START DATE. START DATE OF THE NITF IMAGE | mm/dd/yyyy | 19411207 to 209912 | 03/19/2010 |
| 01m | START TIME | IMAGING START TIME. THE NUMBER OF SECONDS FROM T | ss.sss | 0 to 86400 | 12.3 |
| 01n | END DATE | IMAGING END DATE. END DATE OF THE NITF IMAGE SE | mm/dd/yyyy | 19411207 to 209912 | 03/19/2010 |
| 01o | END TIME | IMAGING END TIME. THE NUMBER OF SECONDS FROM TH | ss.sss | 0 to 86400 | 12.3 |
| 01p | GENERATION COUNT | GENERATION COUNT. THE NUMBER OF TIMES THE DATA | - | 0 to 99 | 0 |
| 01q | GENERATION DATE | GENERATION DATE. THE DATE WHEN THE CURRENT TRE | yyyymmdd | 19411207 to 209912 | NA |
| 01r | GENERATION TIME | GENERATION TIME. THE UTC TIME OF DAY WHEN THE C | ss.sss | 0 to 86400 | NA |

CLOSE WITHOUT SAVING    SAVE    SAVE AND CLOSE    REQUIRED OPTIONAL INSTANCES    DEFAULT

FIG. 6

INPUTFORM 1.07   MODULE 07:   ATTITUDE EULER ANGLES

| INDEX | FIELD NAME | DEFINITION | UNITS | VALUE RANGE | VALUE |
|---|---|---|---|---|---|
| 07 | ATTITUDE EULER ANGLES | EULER ANGLE FLAG. FLAG FIELD INDICATING THE COMBIN | - | Y | Y |
| 07a | SENSOR ANGLE MODEL | TYPE OF SENSOR ANGLE ROTATIONS. CODED VALUE COR | - | 1:YPR | 1:YPR |
| 07b | SENSOR ANGLE 1 | FIRST, SECOND, AND THIRD SENSOR ROTATION ANGLES. | deg | -180 to 180 | 23 |
| 07c | SENSOR ANGLE 2 | FIRST, SECOND, AND THIRD SENSOR ROTATION ANGLES. | deg | -90 to 90 | -34 |
| 07d | SENSOR ANGLE 3 | FIRST, SECOND, AND THIRD SENSOR ROTATION ANGLES. | deg | -180 to 180 | 0 |
| 07e | PLATFORM RELATIVE | SENSOR ANGLES RELATIVE TO PLATFORM FLAG. IF THIS F | - | N | N |
| 07f | PLATFORM HEADING | PLATFORM HEADING, PITCH, AND ROLL ANGLE. THESE TH | deg | 0 to 360 | NA |
| 07g | PLATFORM PITCH | PLATFORM HEADING, PITCH, AND ROLL ANGLE. THESE TH | deg | -90 to 90 | NA |
| 07h | PLATFORM ROLL | PLATFORM HEADING, PITCH, AND ROLL ANGLE. THESE TH | deg | -180 to 180 | NA |

FIG. 7A

INPUTFORM 1.08   MODULE 08:   ATTITUDE UNIT VECTORS

| INDEX | FIELD NAME | DEFINITION | UNITS | VALUE RANGE | VALUE |
|---|---|---|---|---|---|
| 08 | ATTITUDE UNIT VECTORS | ATTITUDE UNIT VECTOR FLAG. FLAG FIELD INDICATING TH | - | N | N |
| 08a | ICX NORTH | IMAGE COORDINATE SYSTEM (IC) X, Y, AND Z AXES ATT | - | -1 to 1 | -.39073113 |
| 08b | ICX EAST | SEE DESCRIPTION 08a | - | -1 to 1 | .920504853 |
| 08c | ICX DOWN | SEE DESCRIPTION 08a | - | -1 to 1 | 0 |
| 08d | ICY NORTH | SEE DESCRIPTION 08a | - | -1 to 1 | .514739782 |
| 08e | ICY EAST | SEE DESCRIPTION 08a | - | -1 to 1 | .218494074 |
| 08f | ICY DOWN | SEE DESCRIPTION 08a | - | -1 to 1 | -.82903757 |
| 08g | ICZ NORTH | SEE DESCRIPTION 08a | - | -1 to 1 | -.76313311 |
| 08h | ICZ EAST | SEE DESCRIPTION 08a | - | -1 to 1 | -.32393079 |
| 08i | ICZ DOWN | SEE DESCRIPTION 08a | - | -1 to 1 | -.5591928 |

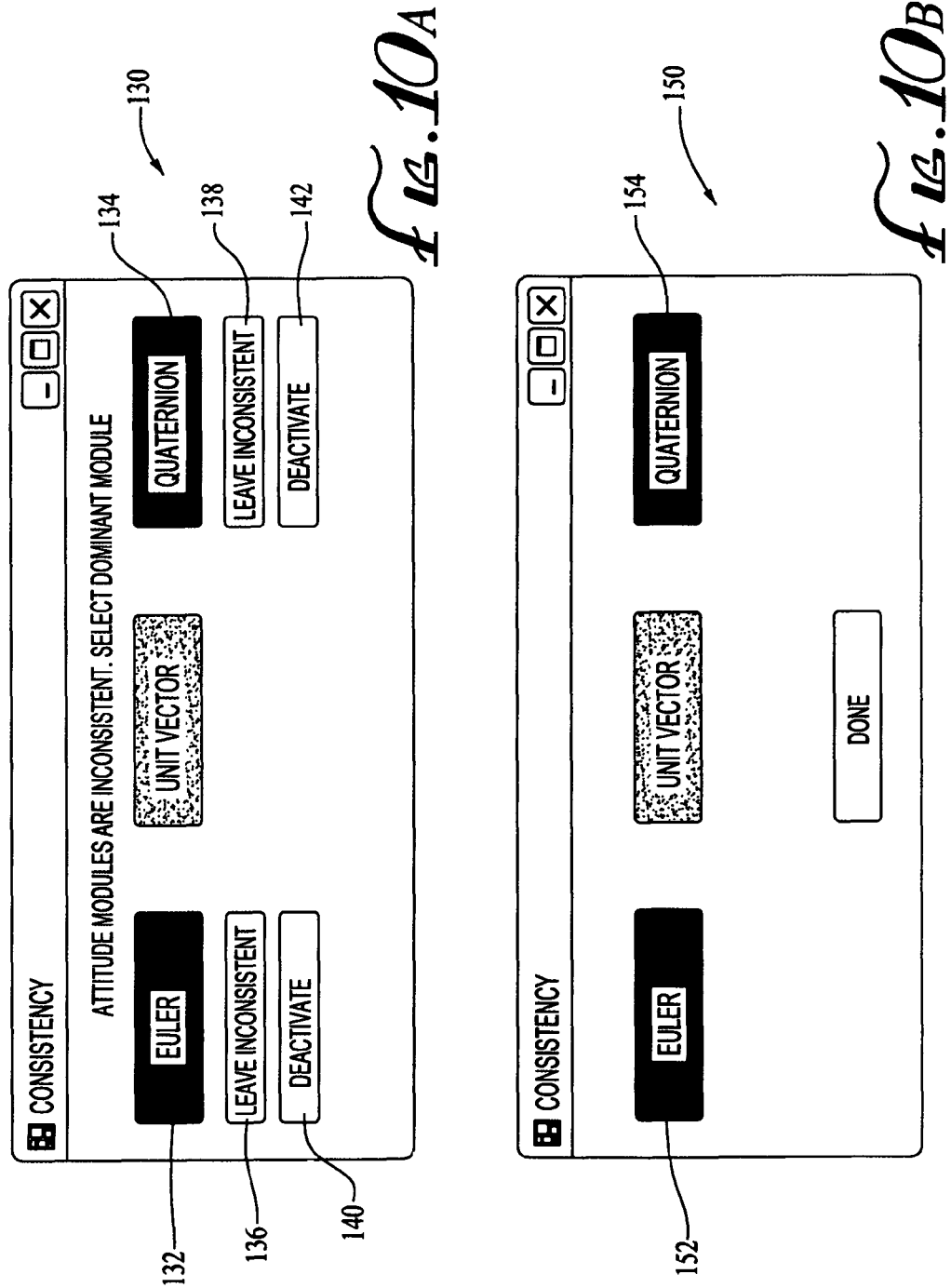

Fig. 11

| INDEX | FIELD NAME | DEFINITION | UNITS | VALUE RANGE | VALUE |
|---|---|---|---|---|---|
| 13 | PIXEL REFERENCE SETS | | | | 4 |
| 13a.1 | PIXEL REFERENCE TYPE | INDEX OF THE PIXEL-REFERENCED PARAMETER 1. | - | 06c: ALTITUDE | 06c: ALTITUDE |
| 13b.1 | PIXEL REFERENCE COUNT | NUMBER OF OCCURRENCES OF PARAMETER 1. | - | 0 TO 9999 | 1 |
| 13c.1.1 | PIXEL REFERENCE ROW | INSTANCE 1 OF A REFERENC | - | 1 TO 99999999 | 128 |
| 13d.1.1 | PIXEL REFERENCE COLUMN | INSTANCE 1 OF A REFERENC | - | 1 TO 99999999 | 128 |
| 13e.1.1 | ALTITUDE | INSTANCE 1 OF PIXEL-REFER | FEET | -1E+07 TO 1E+08 | 2760.2 |
| 13a.2 | PIXEL REFERENCE TYPE | INDEX OF THE PIXEL-REFERENCED PARAMETER 2. | - | 07f: PLATFORM HEA | 07f: PLATFORM HEADING |
| 13b.2 | PIXEL REFERENCE COUNT | NUMBER OF OCCURRENCES OF PARAMETER 2. | - | 0 TO 9999 | 3 |
| 13c.2.1 | PIXEL REFERENCE ROW | INSTANCE 1 OF A REFERENC | - | 1 TO 99999999 | 1 |
| 13d.2.1 | PIXEL REFERENCE COLUMN | INSTANCE 1 OF A REFERENC | - | 1 TO 99999999 | 1 |
| 13e.2.1 | PLATFORM HEADING | INSTANCE 1 OF PIXEL-REFER | DEG | 0 TO 360 | 45.33 |
| 13c.2.2 | PIXEL REFERENCE ROW | INSTANCE 2 OF A REFERENC | - | 1 TO 99999999 | 1 |
| 13d.2.2 | PIXEL REFERENCE COLUMN | INSTANCE 2 OF A REFERENC | - | 1 TO 99999999 | 1 |
| 13e.2.2 | PLATFORM HEADING | INSTANCE 2 OF PIXEL-REFER | DEG | 0 TO 360 | 30.37215 |
| 13c.2.3 | PIXEL REFERENCE ROW | INSTANCE 3 OF A REFERENC | - | 1 TO 99999999 | 1 |
| 13d.2.3 | PIXEL REFERENCE COLUMN | INSTANCE 3 OF A REFERENC | - | 1 TO 99999999 | 1 |
| 13e.2.3 | PLATFORM HEADING | INSTANCE 3 OF PIXEL-REFER | DEG | 0 TO 360 | 16.819 |
| 13a.3 | PIXEL REFERENCE TYPE | INDEX OF THE PIXEL-REFERENCED PARAMETER 3. | - | 07g: PLATFORM PIT | 07g: PLATFORM PITCH |
| 13b.3 | PIXEL REFERENCE COUNT | NUMBER OF OCCURRENCES OF PARAMETER 3. | - | 0 TO 9999 | 2 |
| 13c.3.1 | PIXEL REFERENCE ROW | INSTANCE 1 OF A REFERENC | - | 1 TO 99999999 | 1 |
| 13d.3.1 | PIXEL REFERENCE COLUMN | INSTANCE 1 OF A REFERENC | - | 1 TO 99999999 | 1 |
| 13e.3.1 | PLATFORM PITCH | INSTANCE 1 OF PIXEL-REFER | DEG | -90 TO 90 | -21.5 |
| 13c.3.2 | PIXEL REFERENCE ROW | INSTANCE 2 OF A REFERENC | - | 1 TO 99999999 | 128 |
| 13d.3.2 | PIXEL REFERENCE COLUMN | INSTANCE 2 OF A REFERENC | - | 1 TO 99999999 | 128 |
| 13e.3.2 | PLATFORM PITCH | INSTANCE 2 OF PIXEL-REFER | DEG | -90 TO 90 | 10.55 |
| 13a.4 | PIXEL REFERENCE TYPE | INDEX OF THE PIXEL-REFERENCED PARAMETER 4. | - | 07h: PLATFORM ROL | 07h: PLATFORM ROLL |
| 13b.4 | PIXEL REFERENCE COUNT | NUMBER OF OCCURRENCES OF PARAMETER 4. | - | 0 TO 9999 | 1 |
| 13c.4.1 | PIXEL REFERENCE ROW | INSTANCE 1 OF A REFERENC | - | 1 TO 99999999 | 1 |
| 13d.4.1 | PIXEL REFERENCE COLUMN | INSTANCE 1 OF A REFERENC | - | 1 TO 99999999 | 1 |
| 13e.4.1 | PLATFORM ROLL | INSTANCE 1 OF PIXEL-REFER | DEG | -180 TO 180 | .616 |

STRUCTURED DATA CONVERSION SYSTEM

CROSS-REFERENCE TO RELATED APPLICATIONS

This is a divisional application, claiming the benefit of parent non-provisional application Ser. No. 12/930,910 filed on Dec. 30, 2010, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

COMPUTER PROGRAM LISTING APPENDIX

A computer program listing appendix is submitted on a compact disc and the material included on the compact disc is hereby incorporated by reference. Two compact discs are submitted. The compact discs are labeled as "Copy 1" and "Copy 2," respectively. The number of files one each compact disc is one. The file name on each compact disc is "sbRecordsTemplate." The files were created on Dec. 20, 2010. The file size is 137 kB.

FIELD OF THE INVENTION

The invention generally relates to data conversions, and more particularly, to a structured data conversion system consistent with at least one standard.

BRIEF DESCRIPTION OF THE DRAWINGS

FIG. 2 illustrates a screen shot of a Graphical User Interface of a Structured Data Conversion System, according to embodiments of the invention.

FIG. 3 illustrates a screen shot of a Graphical User Interface of a SENSRB Data Conversion System, according to embodiments of the invention.

FIG. 6 illustrates a screen shot of an input form, according to embodiments of the invention.

FIG. 7A illustrates a screen shot of a SENSRB attitude input form in Euler angles, according to embodiments of the invention.

FIG. 7B illustrates a screen shot of a SENSRB attitude input form in unit vectors, according to embodiments of the invention.

FIG. 8 illustrates a screen shot of a SENSRB attitude input form in quaternions, according to embodiments of the invention.

FIG. 9 illustrates a screen shot of a SENSRB inconsistent attitude representation, according to embodiments of the invention.

FIG. 10A illustrates a screen shot of a SENSRB consistency window notification, according to embodiments of the invention.

FIG. 10B illustrates a screen shot of a SENSRB consistency window after recalculating to eliminate inconsistencies, according to embodiments of the invention.

FIG. 11 illustrates a screen shot of a SENSRB module 13 for pixel referenced sets, according to embodiments of the invention.

Figure 1:
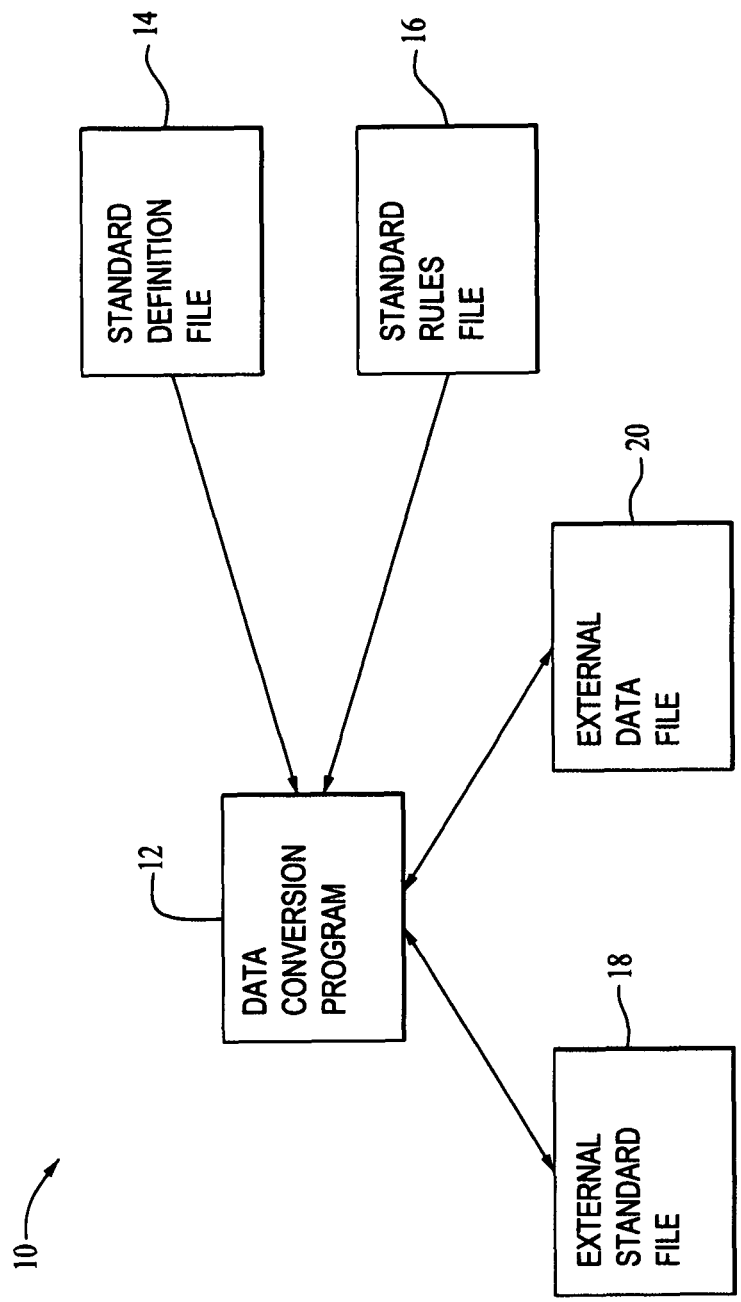
FIG. 1 illustrates a schematic block diagram of a Structured Data Conversion System, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to data conversion, and more particularly, to a structured data conversion system consistent with at least one standard.

Typically, information standards, including SENSRB, are released on a stand-alone basis. SENSRB is a specific type of structured data conversion system used with sensors. Users are expected to read the standard, which is generally quite complex, and formulate a means to implement that standard in support of their activity, either on the creation side (the makers of sensors in the case of SENSRB) or on the receiving side (those looking to exploit the information for subsequent processes, including targeting). Providing an easy to use, functional, intuitive application concurrent with the release of the standard will help to simplify the task of understanding and employing the standard for all users. Because of this, it is desirous to find a structured data conversion system.

Although embodiments of the invention are described in considerable detail, including references to certain versions thereof, other versions are possible. Examples of other versions include performing the steps in an alternate sequence or hosting a program on a different platform. Therefore, the spirit and scope of the appended claims should not be limited to the description of versions included herein.

Embodiments of the invention may take the form of a computer program product on a computer-usable storage medium having computer-usable/readable program instructions embodied in the medium. Any suitable computer readable medium may be utilized including either computer readable storage mediums, such as, for example, hard disks, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or However, computer-usable/readable program instructions for carrying out operations of embodiments of the invention may also be written in conventional procedural programming languages, such as, for example, the "C#" programming language. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instruction means that implement the function/act specified in the flow chart and/or block diagram block or blocks.

These computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flow chart and/or block diagram block or blocks.

Referring to the accompanying drawings in which like reference numbers indicate like elements, FIG. 1 illustrates a first aspect of a structured data conversion system. Reference character 10 generally indicates an apparatus of embodiments of the invention.

Embodiments of the invention generally relate to a data conversion system associated with at least one standard including: a device 12 adaptable to convert data and output converted data in a tangible medium, at least one standard definition file 14 having instructions consistent with at least one standard, where the at least one standard definition file is operatively associated with the device, at least one standard rules file 16 having instructions consistent with the at least one standard, where the at least one standard rules file is operatively associated with the device, at least one external standard file 18 consistent with the at least one standard, where the at least one external standard file is operatively associated with the device, and at least one external data file 20 consistent with the at least one standard, where the at least one external data file is operatively associated with the device. Both the at least one external standard file 18 and the at least one external data file 20 are input and output files, hence the reason for dual arrowed connectors with the device 12 in FIG. 1. The at least one standard rules file 16 is sometimes referred to as a rules external file without detracting from the merits of the invention.

Referring to both FIGS. 2 and 3, screen shots of a Graphical User Interface are shown, according to embodiments of the invention. FIG. 2 illustrates a screen shot of a Graphical User Interface of a Structured Data Conversion System, according to embodiments of the invention. FIG. 3 illustrates a screen shot of a Graphical User Interface of a SENSRB Data Conversion System, according to embodiments of the invention. The SENSRB Data Conversion System is a specific implementation of the Structured Data Conversion System.

In embodiments, the invention generally relates to a data conversion apparatus including: an electronic processing device (not shown) adaptable to convert data and output converted data in a tangible medium, a data conversion computer program 12 (FIG. 1) operatively associated with the electronic processing device, where the data conversion computer program uses a graphical user interface 30A and 30B to display on a display device (not shown), where the display device is operatively associated with the electronic processing device, a selection device (not shown) operatively associated with the display device, at least one standard definition file 14 (FIG. 1) consistent with at least one standard, where the at least one standard definition file is operatively associated with the data conversion computer program, at least one standard rules file 16 (FIG. 1) consistent with the at least one standard, where the at least one standard rules file is operatively associated with the data conversion computer program, at least one external standard file 18 (FIG. 1) consistent with the at least one standard, where the at least one external standard file is operatively associated with the data conversion computer program, and at least one external data file 20 (FIG. 1) consistent with the at least one standard, where the at least one external data file is operatively associated with the data conversion computer program.

In embodiments, the selection device is a computer mouse. The selection device may also be a combination of keys associated with a computer keyboard.

In embodiments, the at least one standard is a set of specifications of content and format to be used in requesting information on a topic, the topic being data that is adaptable for mathematical conversion. The at least one standard is application specific, depending on the particular analysis a user wants to perform. For instance, a particular standard may exist for a broad class of sensors (for which the user, during one execution, is providing information on one particular sensor) while another standard may exist for a class of control systems. Thus, one of the at least one standard is applied with the accompanying at least one standard definition file 14, the at least one standard rules file 16, the at least one external standard file 18, and the at least one external data file 20.

As an example, in a specific application for sensors (SENSRB) of the apparatus 10, the standard is a specification of information about a broad class of sensors (including infrared, radar, and photographic) that could exist on virtually any airborne vehicle or satellite or even on a handheld device carried by a soldier. In any one execution of the apparatus 10, a user is defining information about a particular sensor and about the path of the sensor, such as, for example, on a vehicle as a function of time in three-dimensional space, where the sensor is pointing, and what type of lens it has. Thus, the use could be to define a new sensor for general use by the community or it could be to provide metadata regarding one specific use of the sensor such as, for example, a mission to take photographs using the sensor), without detracting from the scope of the invention.

In embodiments, the device is an electronic processor adapted to run a data conversion computer program 12. The data conversion computer program 12 causes a graphical user interface 30A and 30B to display on a display device (not shown). The display device is a computer monitor. The graphical user interface includes icons (32A through 48A and 32B through 48B) displayed using the display device. The graphical user interface 30A and 30B is displayed on the display device when actuated with the selection device. The graphical user interface 30A and 30B includes at least one external standard file icon 18, delineated as an external structure icon in FIG. 2 and as an external SENSRB icon in FIG. 3. The graphical user interface 30A and 30B also includes at least one external data file icon 20.

In embodiments, the at least one standard definition file 14 is a programmable external file associated with the at least one standard, where the at least one standard definition file defines specifics of the at least one standard, where the at least one standard definition file is editable and extendable to support changes in the at least one standard, the specifics being used to define a plurality of elements used to communicate data in the data conversion system 10. The specifics further dictate how data is written, read, and communicated by the apparatus 10.

In embodiments, the at least one standard definition file 14 provides complete documentation of the standard upon a user mouse-over of a section of the standard with a computer mouse.

In embodiments, the at least one standard rules file 16 is an external file used to specify standard specifics rules used during data input to test data accuracy and data consistency.

In embodiments, the at least one external standard file 18 is a text file adapted for input and output of metadata into and out of the data conversion system 10.

In embodiments, the at least one external data file 20 is a text file adapted for input and output of formatted, human readable records into and out of the data conversion system 10. Examples of formatted, human readable records include tab-deliminated records and graphical images.

In embodiments, the graphical user interface 30A and 30B includes at least one external standard file icon 18. The graphical user interface 30A and 30B includes at least one external data file icon 20.

In embodiments, the graphical user interface 30A and 30B further includes: an internal structure view icon 32A and 32B operatively associated with the data conversion computer program 12, a plurality of read command icons 34A and 34B operatively associated with the data conversion computer program, where the plurality of read command icons are used to read data into a data view format. Also included is a data view icon 36A and 36B operatively associated with the data conversion computer program 12, the data view icon being used to allow a user to view and manipulate data associated with the data view format, a plurality of write command icons 38A and 38B operatively associated with the data conversion computer program, a plurality of convert icons 40A and 40B operatively associated with the data conversion computer program, a plurality of compare icons 42A and 42B operatively associated with the data conversion computer program, a plurality of erase icons 44A and 44B operatively associated with the data conversion computer program, where the plurality of erase icons are used to allow a user to erase previously read in data, a plurality of display format drop-down list icons 46A and 46B operatively associated with the data conversion computer program, where the plurality of display format drop-down list icons are used to display converted data in different formats, a plurality of release icons 48A and 48B operatively associated with the data conversion computer program, and at least one text window 50A and 50B operatively associated with the data conversion computer program, where the at least one text window is used to display a plurality of data view formats. The at least one text window 50A and 50B is also referred to as an active text window and a visualization window.

In other embodiments, the invention includes a method of converting data, including: providing an electronic processing device adaptable to convert data and output converted data in a tangible medium, providing a data conversion computer program 12 operatively associated with the electronic processing device, the data conversion computer program using a graphical user interface 30A and 30B, providing a display device operatively associated with the electronic processing device, providing a selection device operatively associated with the display device, providing at least one standard definition file 14 consistent with at least one standard, the at least one standard definition file being operatively associated with the data conversion computer program, providing at least one standard rules file 16 consistent with the at least one standard, the at least one standard rules file being operatively associated with the data conversion computer program, providing at least one external standard file 18 consistent with the at least one standard, the at least one external standard file being operatively associated with the data conversion computer program and displayed as an icon on the graphical user interface, providing at least one external data file 20 consistent with the at least one standard, the at least one external data file being operatively associated with the data conversion computer program and displayed as an icon on the graphical user interface, executing the data conversion computer program with the selection device, the executing causing the graphical user interface to be displayed to a user on the display device, converting data by operatively selecting a plurality of icons 32A through 48A and 32B through 48B on the graphical user interface 30A and 30B, by actuating the selection device, and outputting the converted data in the tangible medium.

Output includes hard copy printouts, other computer accessible medium such as computer hard drives or floppy discs, visual display screens, as well as other mediums employing identified target coordinates.

The providing at least one standard definition file step includes providing mouse-over capability providing complete documentation of the standard, thus removing the need for a user to keep complete documentation of the standard available when converting data.

The converting data step includes providing: an internal structure view icon 32A and 32B operatively associated with the data conversion computer program 12, a plurality of read command icons 34A and 34B operatively associated with the data conversion computer program, the plurality of read command icons used to read data into a data view format, a data view icon 36A and 36B operatively associated with the data conversion computer program, where the data view icon is used to allow a user to view and manipulate data associated with the data view format, a plurality of write command icons 38A and 38B operatively associated with the data conversion computer program, a plurality of convert icons 40A and 40B operatively associated with the data conversion computer program, a plurality of compare icons 42A and 42B operatively associated with the data conversion computer program, a plurality of erase icons 44A and 44B operatively associated with the data conversion computer program, the plurality of erase icons used to allow a user to erase data inputted into the apparatus, a plurality of display format drop-down list icons 46A and 46B operatively associated with the data conversion computer program, the plurality of display format drop-down list icons used to display converted data in different formats, a plurality of release icons 48A and 48B operatively associated with the data conversion computer program, and at least one text window 50A and 50B operatively associated with the data conversion computer program, the at least one text window used to display a plurality of data view formats.

The plurality of compare icons 42A and 42B includes a first compare icon, a second compare icon, and a third compare icon. For example, compare icons (or buttons) 42B in the SENSRB Data Conversion System compare the data in the two sets on either side of the button. Thus, for example a comparison of two SENSRB files is performed by selecting the first compare icon 42B located between and below the External SENSRB icon 18B and the SENSRB View icon 32B. A comparison of a SENSRB file and a data file is performed by selecting the second compare icon 42B located between and below the SENSRB View icon 32B and the Data View icon 36B. Similarly, a comparison of two data files is performed by selecting the third compare icon 42B located between and below the Data View icon 36B and the External Data icon 20.

Thus, in similar fashion, selecting the first compare icon 42A located between and below the External Structure icon 18 and the Structure View icon 32B with the selection device compares two structure files. Similarly, selecting the second compare icon 42A located between and below the Structure View icon 32A and the Data View icon 36A with the selection device compares a structure file and a data file. Finally, selecting the third compare icon 42A located between and below the Data View icon 36A and the External Data icon 20 with the selection device compares two data files.

The at least one text window 50A and 50B further displays a plurality of data view formats, an activity log, compare requests, and error messages.

The converting data step further includes inputting data into computer memory accessible by the data conversion computer program by using the selection device to actuate a structure view icon 32A and 32B in the graphical user interface 30A and 30B, thereby inputting data producing an external structure file 18.

The converting data step further includes reading previously existing data from the at least one external standard file 18 into the graphical user interface 30A and 30B, where the at least one external standard file is data defined in the format of the at least one standard, by using the selection device to actuate an external structure icon in the graphical user interface.

The converting data step further includes converting data from a structure view format to a data view format by using the selection device to actuate a first convert icon in the graphical user interface 30A and 30B.

The converting data step further includes converting data from the data view format to the structure view format by using the selection device to actuate a second convert icon in the graphical user interface 30A and 30B.

Outputting the converted data in a tangible medium includes displaying the converted data on the display device.

There are many instances in engineering when an application or project needs to communicate to other engineers a complete definition of all of the data related to that particular project. To facilitate this for a particular field of engineering, an authorized group can create a "standard" or a "specification" of the various data elements related to that topic as well the order and format of how those data elements will be communicated. This is called a Structured Data System.

One particular instance of a Structured Data System specification is the SENSRB standard, as illustrated in FIG. 3. A detailed document, NTB RFC-035d, SENSRB, Compendium of Controlled Extensions (CE) for the National Imagery Transmission Format (NITF), has been defined that specifies the set of data and metadata required to communicate information related to airborne sensors, including cameras, infrared sensors, and radar. This standard defines the Structured Data System for modern sensors.

Standards for data and metadata, such as SENSRB, are often complex and subject to interpretation, which degrades the ability for data to be shared seamlessly between projects and organizations and contractors. Moreover, the complexity of the standards often results in significant ramp-up time before systems can be fully integrated utilizing those standards.

The apparatus 10 acts as a software implementation of such a standard and changes the user involvement into a straightforward, intuitive engineering process. The ease of use, additional clarity, the savings in time to implement and to utilize the data, and the generalization of the approach to additional standards provides the Navy and the government with a clear opportunity for substantial saving both in terms of time and money.

A particular strength of this invention is its generality in being able to support a large class of Structured Data Systems. The invention utilizes an external "template" file to define the complete set of data elements including their definitions and specifications within a particular standard. It also utilizes an external "rules" file to define standard-specific relationships between data elements.

The system also serves to provide data conversion facilities so that data that already exists in another standard can be converted or used as a starting point for further distribution or subsequent applications.

The system uses a fully-icon based user interface combined with easy to interpret drop-down lists, as well as input and output tables created in real time, so as to make the system unusually easy to use for both novice and expert users alike.

An additional advantage of the system is the methodology by which the software has been implemented. Rather than having the software implement the SENSRB standard directly, the system uses an external file (a text file or spreadsheet file) to define all of the elements of the standard that are to be revealed to the user. As a result, any changes, minor or major, to the standard generally require only the creation of a new version of the external file, and do not require additional software development. This external file can not only define the elements of the standard, it also provides the complete documentation, presented upon a user "mouse-over" of that section of the standard, thus removing the requirement for the user to keep the complete documentation available during use of the product.

Consistent with the advantage of the external file definition for the standard, the system also utilizes another external file to define standard-specific rules that can be applied during execution of the project to aid the user in detecting errors and inconsistencies in the data. The rules are externally defined which serves to reduce the amount of standard-specific actions in the software itself. This not only improves ease of maintenance of the standard, it also allows extension of the rules to support new observations derived by use in the community.

The overall flow and use of the system is represented in the icon-based user interface (the graphical user interface). The primary functions of the data conversion elements of the system are invoked and displayed using the graphical user interface. Each of the rectangular icons in the interface represents an action that the user can invoke.

FIG. 3 illustrates the set of major options available to the user in creating, converting, storing, reading, and comparing data in various formats. The various objects in the window are icons, each of which causes a certain action to take place. Starting from the left in FIG. 3, the user can open an externally defined SENSRB file, which can then be seen and then read into the SENSRB View system. The user can select the SENSRB View icon 32B to either create a complete set of standards data from scratch or to view and modify external data that has been read.

The two convert icons 40B, convert data to and from the two major classes of formats: the SENSRB tagged record format (and its complimentary input mode forms) and a data view format. A data view is an engineering oriented format such as, for example, a columnar format as one might see in a spreadsheet file or a word processing table. Another data view is an XML format. The specific format is selected from a drop-down list shown in green and located below the data view icon. The user can request that a data view of any format be written to at least one external data file and similarly at least one external data file can be read into the data view. Yet another data form is a three-dimensional graphical representation of the data in relation to the earth.

The compare buttons 42B compare the data in the two sets on either side of the button, for example a comparison of two SENSRB files, or a comparison of a SENSRB file and a data file, or a comparison of two data files.

The window at the bottom of the interface is an active text window 50B that displays information appropriate to the current activity. Generally this shows the data contained in the data system currently selected (and outlined in red). In other instances, the text window 50B will display supporting information such as an activity log, or error messages, or the results of a compare request.

When the user is creating a complete SENSRB model or viewing an existing model, additional iconic representation are displayed to the user that provide not only control but user feedback to guide the process. A fully icon driven and intuitive interface helps in the broad acceptance of the product.

In SENSRB, the at least one standard definition file 14 is labeled sb Records Template and is a computer file. The sb Records Template file defines all parameters applicable to input forms of the apparatus 10. The spreadsheet version of the external file is used to define the specifics of the standards implementation of SENSRB. The table can be edited and extended to support changes to the standard or to support additional standards or engineering data systems.

Table I is submitted on the accompanying compact discs (Copy 1 and Copy 2). Table I shows an example of the data fields inherent with the sb Records Template file.

The at least one external rules file 16 is used to specify standard specific rules to be applied during data input to test data accuracy and data consistence. There are three classes of data in the at least one external rules file 16. The three classes of data are constants, module rules, and Tagged Record Extension (TRE) rules. Constants modify program behavior and define values that can be used elsewhere in the rules. Module rules define the rules for data accuracy within any single module and are invoked when the user completes a module. TRE rules define rules for data consistency and module completeness and are generally applied across modules. TREs are invoked when the user has completed module input and saves the TRE.

An example of the standard rules file 16 associated with SENSRB is shown in Table II.

Figure 4:
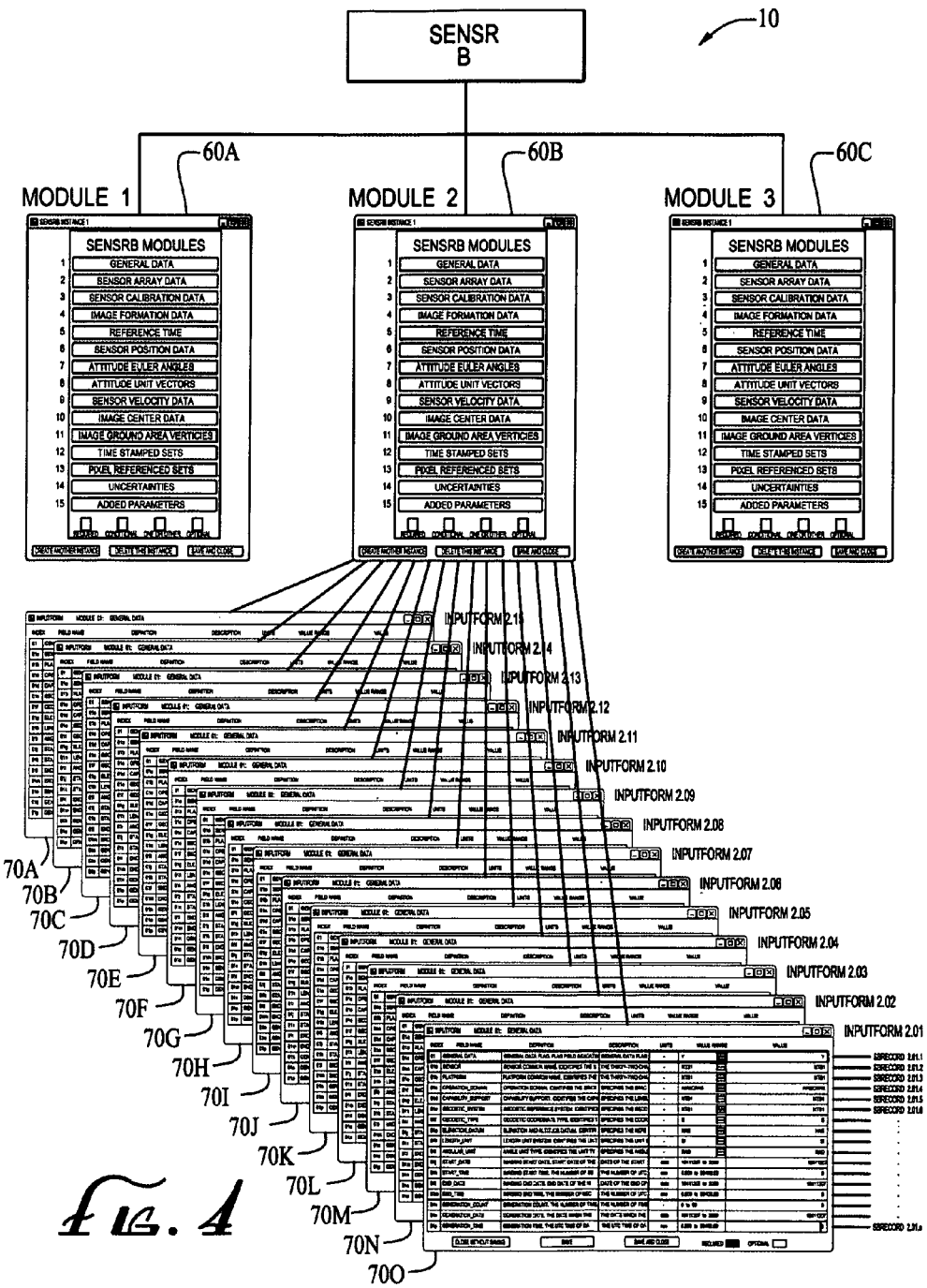
FIG. 4 illustrates an image of the hierarchical structure of an SENSRB Data Conversion System, according to embodiments of the invention.

Table II: Example Standard Rules File Associated with SENSRB
/Constants
baseDirectory, d:
eps, 1E-6
/ModuleRules
01, GeneralData, 01p, 01q, 01r
02, SensorArray, 02d, 02e, 02f, 02g, 02h
04, ImageFormation, 04k, 04l, 04m, 04n, 04o, 04p, 04q, 04r, 04s
05, ReferenceTime, 05a, 05b, 05c
06, SensorPosition, 06a, 06b, 06c, 11000, 6352800
07, EulerAngle, 07e, 07f, 07g, 07h
08, UnitVector, 08a, 08b, 08c, 08d, 08e, 08f, 08g, 08h, 08i, eps
09, Quaternion, 09a, 09b, 09c, 09d, eps
/TRERules
00, GroundPts, 11, 11c, 11d, 11e, 11f=1, ModuleOr2, 12, 13, 04a, Pushbroom
=1, ModuleOr2, 12, 13, 04a, Whiskbroom
>1, ModuleReq, 14, 09f FIG. 4 illustrates an image of the hierarchical structure of an SENSRB Data Conversion System, according to embodiments of the invention. Module 1 60A, Module 2 60B, and Module 3 60C depict graphic representations of the fifteen modules in the first instantiation of a SENSRB data set. The hierarchical structure is further defined by showing input forms 70A through 70O associated with Module 2 60B.

For a user looking to create a SENSRB file from scratch, or looking to explore the details of the SENSRB specification, the user presses the SENSRB View icon 32B (shown in FIG. 3). When there is no SENSRB data yet, a new, first instance of a Modules Form 60B, is shown FIG. 5. When SENSRB data does exist at this level, pressing the SENSRB View icon 32B will open all instances of the Modules Form 60B.

The Modules Form 60B is a graphic representation of the fifteen modules in the first instantiation of a SENSRB data set. Each of the fifteen named rectangles is a button that opens a new or existing module. The buttons are color-schemed. When a button is outlined in red on the screen, data exists within that module and that data will be presented to the user when that button is pressed. The SENSRB standard is composed of fifteen modules per TRE. Other standards, however, may have more or less modules than the SENSRB standard without detracting from the scope of the invention.

The color of each button represents whether that module is Required, Conditional, a One or Other module, or an Optional module. Initially, the Modules Form 60B shows the modules required for a Content Level 2 SENSRB.

Figure 5:
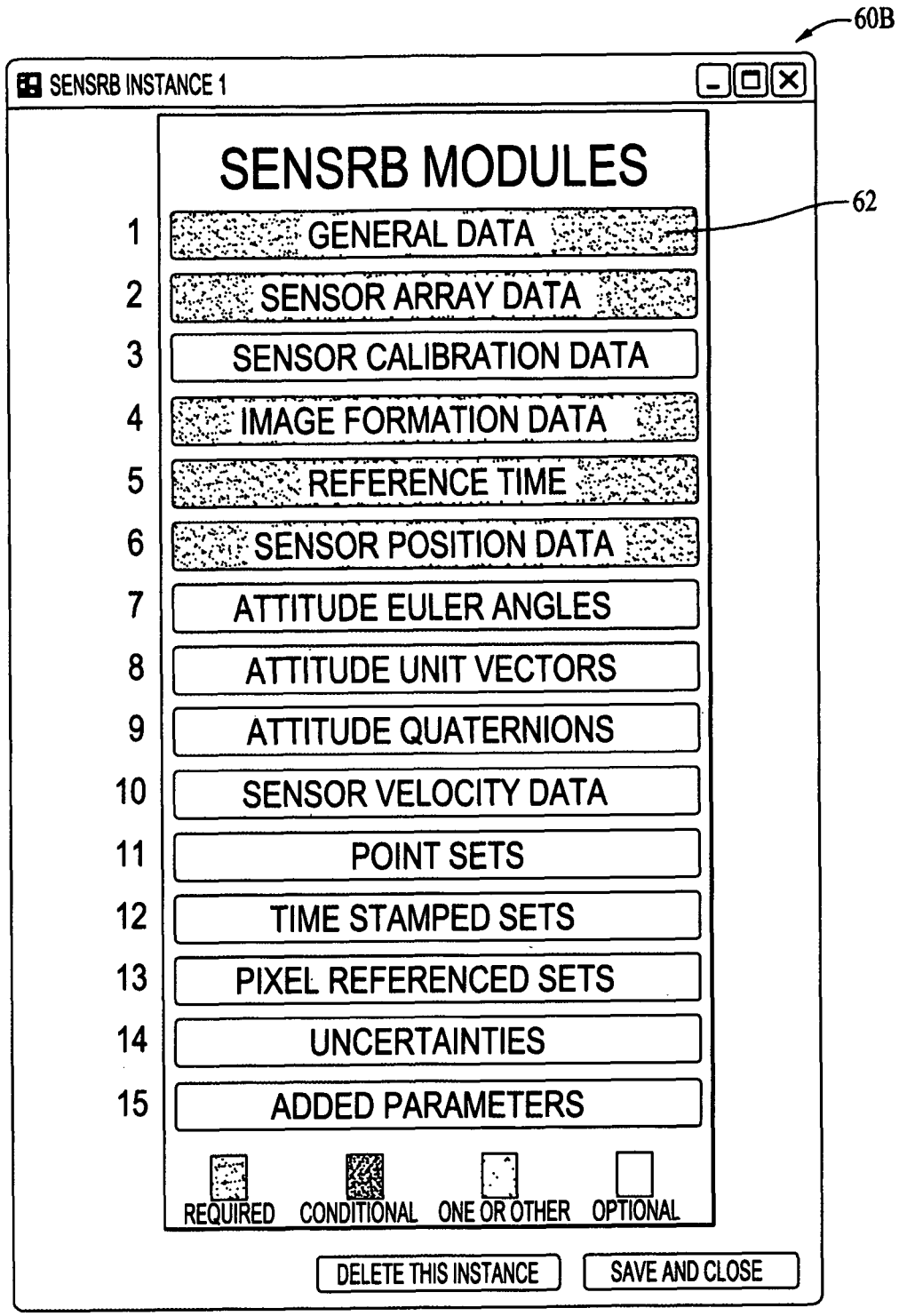
FIG. 5 illustrates a screen shot of a SENSRB Modules Form, according to embodiments of the invention.

When a general data icon button 62 is selected in FIG. 5, an input form 70 is open and displayed to the user as shown in FIG. 6. The terminology 1.01 as shown in FIG. 6 means Modules Form (instance) 1 and the module is 01. The data associated with the first module set is extremely important and drives all subsequent forms in terms of elements including units, geodetic coordinate type, Content Level, Sensor and Platform types. As a result, the form is presented automatically, and the buttons on the Modules Form for other modules are not active until the first form has been fully defined and saved (using either the Save 72 or Save and Close 74 buttons on the bottom of InputForm 1.01).

The user can enter data using a keyboard and move between fields using the tab or enter key (use shift-tab or shift-enter to move in the upward direction) or computer mouse. For numeric fields, the Value Range includes a "min to max" specification of the permissible range of acceptable values. For alphanumeric fields, the Value Range includes a drop down list of possible, generally NTB registered, values for that field.

The Units column 76 defines the system of units that should be used to enter data for that field. Unitless values, including integers and pixels, are represented as a "-". All other fields have a variety of units that can be used to enter or view the data. For example, when entering a velocity, the possible units are meters/sec, ft/sec, km/hr, miles/hr, and knots. Even though the final results will be stored in the default units as defined in form 1.01, the user may enter or view any input in any units without concern for its final state. In addition, a Value Range column 78 will adjust, when appropriate, to show the min and max range in the selected units.

For any form, those fields that have a gray background are fields that have yet to be defined. All fields, with the exception of "NA" fields, must be input, and thus turned non-gray, in order to be identified as defined, that is, a value having been entered. Another way to cause a value to be "defined" is to move the insertion point into the field and then hit the enter key (tab will only move to the next field). The input form 70 will not close until all values have been defined. The Default button 80 can be used to cause all fields to be designated as "defined."

The user may have as many modules (Input Forms) open as needed. Similarly, the user may have as many Tagged Record Extensions, TRE's (Module Forms), open as needed. However, all Input Forms must be closed, generally by selecting the "Save and Close" button 74 before the user can close the corresponding parent Module Form.

Modules 11, 12, 13, and 14 (shown in FIG. 5) contain looping fields, that is, potentially multiple instantiations of the high level and/or internal data sets. When the user enters the value for a Set or Count, the Input Form will automatically expand or contract to support the new definition. Scroll bars are added to the form when it extends beyond the height of the screen. The user may also reduce the size of a window by dragging the mouse down when at the top of a window. The representation of the form is modified slightly to provide indents and full Index descriptions to aid in understanding of the information.

Moving the mouse over Definition column 82 of a field, the third column of the Input Form 70, will provide a pop-up of the full specification description of a particular item.

When the input mode is completed by filling in the necessary fields for the application and closing the Input Form 70, the user presses the Save and Close button 74 on the bottom right of the Input Form 70. When Instance 1 of the Modules Form 60B, then the entire SENSRB and all subsequent TREs will be written into the top form, the SENSRB Data Conversion form. When the Module Form selected is an instance higher than 1, then only that subordinate SENSRB TRE will be written (appended to any prior SENSRB characters already in that high-level window).

The character based SENSRB header will be displayed in the window and the drop down list will show "TRE View". When error messages are created, accompanied by a "bell" sound, they will be displayed in the "Input Mode" view. Short error messages are displayed in a pop-up window.

When the SENSRB information has been created, pressing the write button 38B to the left of the SENSRB View (shown in FIG. 3) writes the SENSRB information to a file. A browser window permits the user to specify the name and location of the file and the default file suffix will be ".txt." Once the file is written, it is automatically released so that other applications may use it.

To view an existing, stored SENSRB file, the user touches the "External SENSRB" icon and a browser window will allow the user to select the file, which is then displayed in the visualization window.

To read an existing SENSRB file into the input forms, the user selects the read icon 34B to the left of the SENSRB View to read a selected External SENSRB file, or to select a file when one has not been selected, into the complete set of Module Forms and Input Forms. The full set of existing Module Forms will be displayed with red borders on the individual modules that have data.

When errors are detected during the Read process, the particular Input Form that contains the first error will be presented and the field(s) that are not properly defined will be shown with a light red background and an error message will be displayed for each error found on that particular form. The system will not move to subsequent modules once an error has been detected because typically a character based input file will generate many errors from a single character offset error.

When a SENSRB model has been created, the user can compare the results of that TRE to another TRE stored on disk. When necessary, the user may release any external file currently open by selecting the release icon 48B (FIG. 3) and then selecting the External SENSRB icon 32B, or simply selecting the Compare button icon 42B, and selecting the file. A compare operation may be performed between the two character-based TREs and the region surrounding the first differences will be displayed in the visualization window.

The ten icons to the right of the SENSRB View icon represent operations on various representations of the data. To get data into data view format, the user presses the Convert icon 40B (FIG. 3) after creating a SENSRB model (it is not necessary to create the actual SENSRB format or to create a file). The result is a format of the SENSRB called a Name View. A portion of a sample Name View is shown below in Table M.

TABLE III

Sample of Name View Format

| | | |
|---|---|---|
| 1.01 | General Data | Y |
| 1.01a | Sensor | SHARP |
| 1.01b | Sensor URI | |
| 1.01c | Platform | F-18 |
| 1.01d | Platform URI | |
| 1.01e | Operation Domain | Airborne |
| 1.01f | Content Level | 6 |
| 1.01g | Geodetic System | WGS84 |
| 1.01h | Geodetic Type | G |
| 1.01i | Elevation Datum | HAE |
| 1.01j | Length Unit | EE |
| 1.01k | Angular Unit | DEG |
| 1.01l | Start Date | 20100319 |
| 1.01m | Start Time | 000000000012.3 |
| 1.01n | End Date | 20100319 |
| 1.01o | End Time | 000000000012.3 |
| 1.01p | Generation Count | 00 |
| 1.01q | Generation Date | -------- |
| 1.01r | Generation Time | ---------- |
| 1.02 | Sensor Array Data | Y |
| 1.02a | Detection | Visible |
| 1.02b | Row Detectors | 00001024 |
| 1.02c | Column Detectors | 00001024 |
| 1.02d | Row Metric | 000.9442 |
| 1.02e | Column Metric | 000.9442 |
| 1.02f | Focal Length | 3.937008 |
| 1.02g | Row Fov | -------- |
| 1.02h | Column Fov | -------- |
| 1.02i | Calibrated | N |
| 1.03 | Sensor Calibration Data | N |
| 1.04 | Image Formation Data | Y |

TABLE III-continued

Sample of Name View Format

| 1.04a | Method | Single Frame |
| 1.04b | Mode | 001 |
| 1.04c | Row Count | 00001024 |

The Index View format is a two column table similar to the Name View with the names of the fields removed.

Table IV shows a portion of a sample XML representation of the TREs and the modules within each TRE.

TABLE IV

Portion of Sample XML View

```
<?xml version="1.0" encoding="UTF-8"?>
<!-- Processed by SENSRB Data Conversion System -->
<Document>
    <name>SENSRB</name>
    <Folder>
        <name>TRE1</name>
        <Folder>
            <name>Module01</name>
            <1.01>Y</1.01>
            <1.01a>SHARP          </1.01a>
            <1.01b>                </1.01b>
            <1.01c>F-18           </1.01c>
            <1.01d>                </1.01d>
            <1.01e>Airborne </1.01e>
            <1.01f>6</1.01f>
            <1.01g>WGS84</1.01g>
            <1.01h>G</1.01h>
            <1.01i>HAE</1.01i>
            <1.01j>EE</1.01j>
            <1.01k>DEG</1.01k>
            <1.01l>20100319</1.01l>
            <1.01m>000000000012.3</1.01m>
            <1.01n>20100319</1.01n>
            <1.01o>000000000012.3</1.01o>
            <1.01p>00</1.01p>
            <1.01q>--------</1.01q>
            <1.01r>----------</1.01r>
        </Folder>
        <Folder>
            <name>Module02</name>
            <1.02>Y</1.02>
            <1.02a>Visible         </1.02a>
            <1.02b>00001024</1.02b>
            <1.02c>00001024</1.02c>
```

To switch between data views, the user selects the drop down box 46B below the Data View icon 36B (FIG. 3) to select the representation desired. The dominant view is the Name View and generally the other views are derived from it. However, when only an Index View or an XML View exist, for example in an external data file, that view can be converted into a Name View by using generic Field Names (the names used in the documentation but not precisely the names used in operation, for example "Latitude" for Geodetic Type and "Geocentric X" for Cartesian Type. Future work includes adding other data views to the system.

The user converts data view to and from the SENSRB view by selecting the convert icons 40B (FIG. 3) to convert from a SENSRB to a Data View and vice versa. When creating a SENSRB from a Data View, both a character based TRE is created as well as the complete set of module forms and input forms.

The user compares data view format to SENSRB view format by selecting the compare icon 42B (FIG. 3) below the convert icons 40B. Although these are very different types of files, a report is generated in a Name View style of format, a sample of which is shown below in TABLE V.

TABLE V

Sample of Data View to SENSRB View Comparison
SENSRB to Data - Comparison Results: Differences Have Been Detected

| Index | FieldName | Value Left | Value Right |
|---|---|---|---|
| 1.01l | Start Date | 20100319 | 20100312 |
| 1.01m | Start Time | 12.3 | 16.875 |
| 1.01n | End Date | 20100319 | 20100312 |
| 1.01o | End Time | 12.3 | 16.875 |
| 1.04 | Image Formation Data | Y | N |
| 1.04a | Method | Single Frame | [not-defined] |
| 1.04b | Mode | 001 | [not-defined] |
| 1.04c | Row Count | 00001024 | [not-defined] |
| 1.04d | Column Count | 00001024 | [not-defined] |
| 1.04e | Row Set | 00001024 | [not-defined] |
| 1.04f | Column Set | 00001024 | [not-defined] |
| 1.04g | Row Rate | 0 | [not-defined] |
| 1.04h | Column Rate | 0 | [not-defined] |
| 1.04i | First Pixel Row | 00000000 | [not-defined] |
| 1.04j | First Pixel Column | 00000000 | [not-defined] |
| 1.04k | Transform Params | 0 | [not-defined] |

The user may write any format data view to diskette by first selecting the format, or view that the user wishes to save. The user then selects the write icon 38B (FIG. 3). A dialog box permits the user to name the file and select its file location. The file is released after writing. A Name View is a tab-delimited file and so you can subsequently open that file in a spreadsheet program, for example, by creating a multi-column worksheet.

The user may read any format external file into data view by selecting the external data icon 20 (FIG. 3) and selecting the file, or simply selecting the read icon 34B (FIG. 3). The file will be analyzed to determine the type of file and then it will be read into the appropriate View. After the file has been read, the user selects the Name View when the user wishes to convert that into SENSRB View.

The erase icons 44B (FIG. 3) are good ways to get a fresh start in creating a SENSRB file from scratch when the user needs to start over for some reason. Selecting the erase icons 44B will delete all ModuleForms and all associated Input-Forms. The erase icon under the Data View will erase the particular Data View currently being viewed. For example, the user can erase the XML View and go back to the Name View and make changes. By again selecting the XML View, the changes the user has made will be reflected in the XML View.

Data may be modified in the active text window 50B. The active text window 50B is used to show all of the views. A red box surrounds whichever data type is currently active, for example, External SENSRB, SENSRB, Data View, or External Data. By selecting each major icon, the user will cause the active text window 50B to change to show the contents of the selected icon.

The text window 50B is always active. The user can edit the file, including insertions, deletions, copy, paste, and selecting all. For example, to copy a Data View into a word processing program, the user touches the Data View text window, enters commands specific to the particular word processing program, then actuates the word processing program, and pastes the selected item.

A change made in the text window 50B of any active component becomes a part of that data and any use of that data will reflect those changes. For example, when the user makes changes to a Name View table, and then "Convert" into SENSRB, the new SENSRB will contain those changes.

Three attitude input forms are unique in that they provide three different means of defining the same information in a SENSRB file. A person having ordinary skill in the art will recognize that attitude input forms are also called attitude modules. The user may input the attitude data using any of these modules: Euler Angles, Unit Vectors, and Quaternions.

FIG. 7A illustrates a screen shot of a SENSRB attitude input form 90 in Euler angles, according to embodiments of the invention.

FIG. 7B illustrates a screen shot of a SENSRB attitude input form 100 in unit vectors, according to embodiments of the invention.

Figures 8, 9:
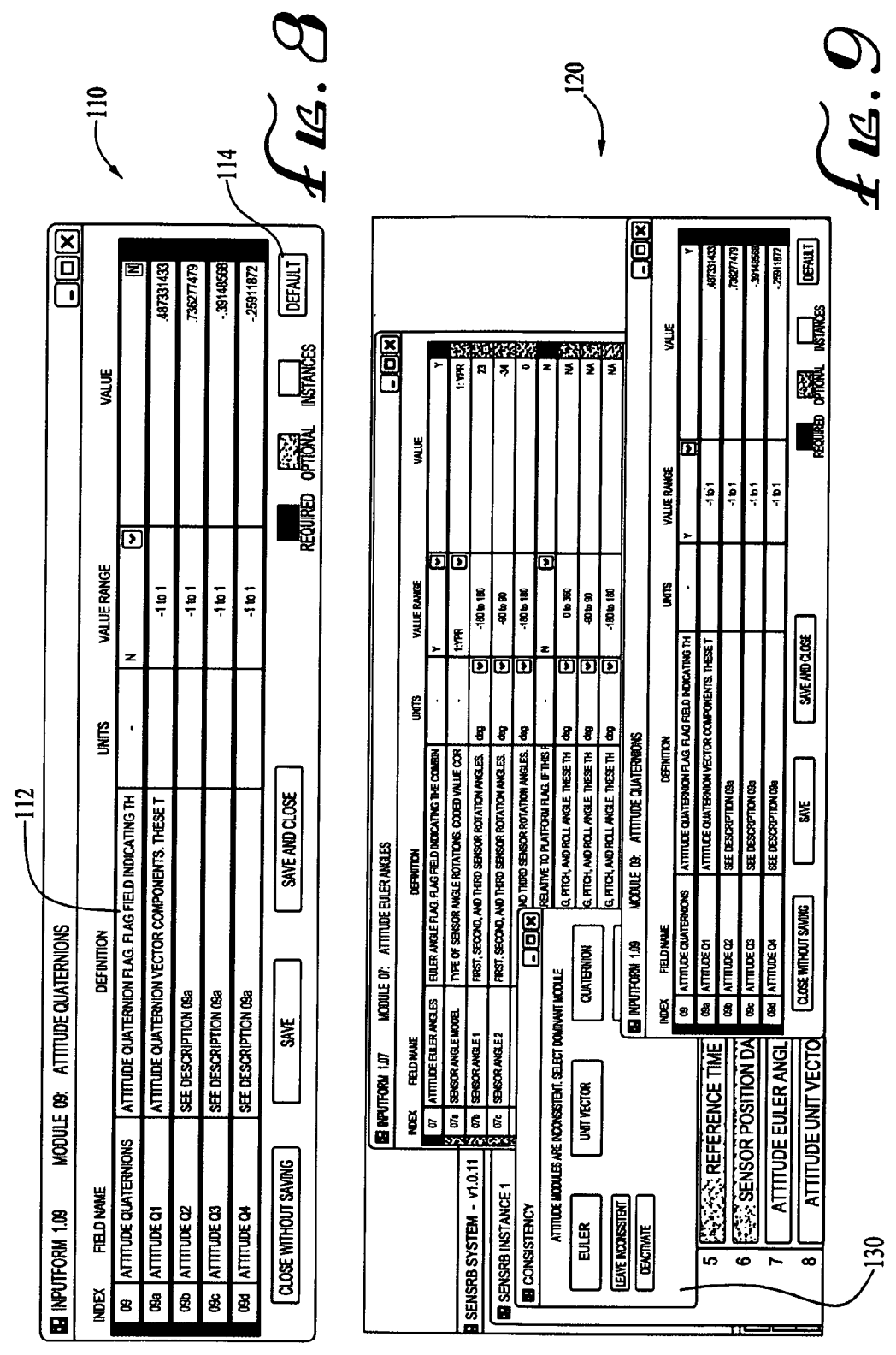

FIG. 8 illustrates a screen shot of a SENSRB attitude input form 110 in quaternions, according to embodiments of the invention.

Using the SENSRB Data Conversion Tool, the user may open another attitude module and view that same information in another format. In all views, the form is pre-populated with the values appropriate for those forms consistent with the first defined form. As shown in FIGS. 7A, 7B, and 8, a flag field 92, 102, and 112 is "N" and all of the new fields are gray (undefined).

The SENSRB TRE can include multiple attitude modules, thus making it permissible to change the flag field 92, 102, and 112 to "Y" and select a default icon 94, 104, and 114 and accept the pre-populated values in those fields.

FIG. 9 illustrates a screen shot of a SENSRB inconsistent attitude representation 120, according to embodiments of the invention. This occurs where two or more attitude modules could be defined that are inconsistent representations of the attitude. In FIG. 9, the sign is changed on one of the terms in the Quaternion Module. The user sees the FIG. 9 screen when attempting to save that module.

A consistency window 130 has appeared indicating that, in this case, there are two inconsistent Attitude Modules. The buttons in the window provide a variety of means to address the problem.

FIG. 10A illustrates a screen shot of a SENSRB consistency window 130 notification, according to embodiments of the invention. In the example shown in FIG. 10A, the user sees an Euler icon 132 and a Quaternion icon 134. The user will select either the Euler icon 132 or the Quaternion icon 134 to indicate which definition should prevail. Additionally, the consistency window 130 includes two leave inconsistent icons 136 and 138 and two deactivate icons 140 and 142. The user could elect to leave the two modules inconsistent in which case both modules will be eventually written to the SENSRB file. The deactivate icons cause the flag field 92, 102, or 112 in FIG. 7A, 7B, or 8 of the corresponding Module to be set to "N".

Selecting the quaternion icon 134 in FIG. 10A displays FIG. 10B, which illustrates a screen shot of a SENSRB consistency window after recalculating to eliminate inconsistencies 150, according to embodiments of the invention. Additionally, selecting the quaternion icon results in gray fields in the updated Euler form. An Euler icon 152 and a Quaternion icon 154 are displayed in green to indicate consistency.

FIG. 11 illustrates a screen shot of a SENSRB module 13 for pixel referenced sets 160, according to embodiments of the invention. FIG. 11 is a sample of a user data form for module 13 including multiple instantiations of data sets 162A, 162B, 162C, 162D, and 162E and data counts 164A, 164B, 164C, and 164D. Data forms are created dynamically because the contents are defined from the external sb Records Template file and extended in real-time as a result of user input. For example, the number of fields (rows) in a form would increase when an instantiation value, a sets parameter, is changed from the default value of one to, as an example, four 162A as shown in sample Module 13 160. In addition, index values 166, field names 168, drop-down menus 170, minimum/maximum range, and even pop-up descriptions presented in the form change during the course of user input.

Converted data may also be represented in graphical form such as, for example, a representation of the three-dimensional location and orientation of sensor-related information relative to the earth.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of converting infrared, radar, and photographic sensor data with a non-transitory electronic-processor-readable medium executing a sensor data conversion computer program, comprising:

providing an electronic processor configured to convert sensor data and output said converted sensor data in a tangible medium;

providing an infrared, radar, and photographic sensor data conversion computer program operatively associated with said electronic processor, said infrared, radar, and photographic sensor data conversion computer program using a graphical user interface;

providing a visual display device operatively associated with said electronic processor device;

providing a user-selection device operatively associated with said visual display device;

providing at least one sensor standard definition file consistent with at least one sensor standard, said at least one sensor standard definition file configured for input to said infrared, radar, and photographic sensor data conversion computer program, wherein said at least one sensor standard definition file is a programmable external file defining specifics of said at least one sensor standard, wherein said specifics define a plurality of elements used to communicate sensor data in said sensor data conversion computer program, wherein said at least one sensor standard definition file is editable and extendable to support changes in said at least one sensor standard;

providing at least one sensor standard rules file consistent with said at least one sensor standard, said at least one sensor standard rules file operatively associated with said infrared, radar, and photographic sensor data conversion computer program;

providing at least one sensor external standard file consistent with said at least one sensor standard, said at least one sensor external standard file operatively associated with said infrared, radar, and photographic sensor data conversion computer program and displayed as an icon on said graphical user interface;

providing at least one external data file consistent with said at least one sensor standard, said at least one external data file operatively associated with said infrared, radar, and photographic sensor data conversion computer program and displayed as an icon on said graphical user interface;

executing said infrared, radar, and photographic sensor data conversion computer program with said user-selection device, said executing causing said graphical user interface to be displayed to a user on said visual display device;

converting infrared, radar, and photographic sensor data by operatively selecting a plurality of icons on said graphical user interface, by actuating said user-selection device; and outputting said converted infrared, radar, and photographic sensor data in said tangible medium.

2. The method according to claim 1, wherein said providing at least one sensor standard definition file further includes providing mouse-over capability, which provides complete documentation of said at least one sensor standard, thus removing the need for a user to keep complete documentation of said at least one sensor standard available when converting infrared, radar, and photographic sensor data.

3. The method according to claim 1, wherein said converting data by operatively selecting a plurality of icons on said graphical user interface further includes providing: at least one external standard file icon, at least one external data file icon, an internal structure view icon operatively associated with said infrared, radar, and photographic sensor data conversion computer program, a plurality of read command icons operatively associated with said infrared, radar, and photographic sensor data conversion computer program, said plurality of read command icons used to read data into a data view format, a data view icon operatively associated with said infrared, radar, and photographic sensor data conversion computer program, said data view icon used to allow a user to view and manipulate data associated with said data view format, a plurality of write command icons operatively associated with said infrared, radar, and photographic sensor data conversion computer program, a plurality of convert icons operatively associated with said infrared, radar, and photographic sensor data conversion computer program, a plurality of compare icons operatively associated with said infrared, radar, and photographic sensor data conversion computer program, a plurality of erase icons operatively associated with said infrared, radar, and photographic sensor data conversion computer program, said plurality of erase icons used to allow a user to erase data inputted into said apparatus, a plurality of display format drop-down list icons operatively associated with said infrared, radar, and photographic sensor data conversion computer program, said plurality of display format drop-down list icons used to display converted data in different formats, a plurality of release icons operatively associated with said infrared, radar, and photographic sensor data conversion computer program, and at least one text window operatively associated with said infrared, radar, and photographic sensor data conversion computer program, said at least one text window used to display a plurality of data view formats.

4. The method according to claim 3, wherein said plurality of compare icons includes a first compare icon, a second compare icon, and a third compare icon.

5. The method according to claim 4, wherein selecting said first compare icon with said user-selection device compares two structure files.

6. The method according to claim 4, wherein selecting said second compare icon with said user-selection device compares a structure file and a data file.

7. The method according to claim 4, wherein selecting said third compare icon with said user-selection device compares two data files.

8. The method according to claim 3, wherein said at least one text window further displays a plurality of data view formats, an activity log, compare requests, and error messages.

9. The method according to claim 1, wherein said converting data further comprises inputting data into computer memory accessible by said infrared, radar, and photographic sensor data conversion computer program by using said user-selection device to actuate a structure view icon in said graphical user interface, thereby inputting data producing an external structure file.

10. The method according to claim 1, wherein said converting data further comprises reading previously existing data from said at least one sensor external standard file into said graphical user interface, wherein said at least one sensor external standard file is data defined in the format of said at least one sensor standard, by using said user-selection device to actuate an external structure icon in said graphical user interface.

11. The method according to claim 1, wherein said converting infrared, radar, and photographic sensor data further comprises converting infrared, radar, and photographic sensor data from a structure view format to a data view format by using said user-selection device to actuate a first convert icon in said graphical user interface.

12. The method according to claim 1, wherein said converting data further comprises converting infrared, radar, and photographic sensor data from a data view format to a structure view format by using said user-selection device to actuate a second convert icon in said graphical user interface.

13. The method according to claim 1, wherein said outputting said converted infrared, radar, and photographic sensor data in a tangible medium further includes displaying said converted infrared, radar, and photographic sensor data on said visual display device.

* * * * *